(12) United States Patent
Brown-Kerr et al.

(10) Patent No.: US 9,683,440 B2
(45) Date of Patent: Jun. 20, 2017

(54) DOWNHOLE METHOD AND ASSEMBLY FOR OBTAINING REAL-TIME DATA

(71) Applicant: Halliburton Manufacturing and Services Limited, Leatherhead, Surrey (GB)

(72) Inventors: William Brown-Kerr, Dyce (GB); Bruce Hermann Forsyth McGarian, Stonehaven (GB)

(73) Assignee: Halliburton Manufacturing and Services Limited, Leatherhead, Surrey (GB)

( * ) Notice: Subject to any disclaimer, the term of this patent is extended or adjusted under 35 U.S.C. 154(b) by 224 days.

(21) Appl. No.: 14/418,455

(22) PCT Filed: Nov. 13, 2013

(86) PCT No.: PCT/GB2013/052988
§ 371 (c)(1),
(2) Date: Jan. 30, 2015

(87) PCT Pub. No.: WO2014/080178
PCT Pub. Date: May 30, 2014

(65) Prior Publication Data
US 2015/0204185 A1    Jul. 23, 2015

(30) Foreign Application Priority Data
Nov. 20, 2012   (GB) .................................. 1220857.5

(51) Int. Cl.
*G01V 3/00* (2006.01)
*E21B 47/12* (2012.01)
(Continued)

(52) U.S. Cl.
CPC ............ *E21B 47/122* (2013.01); *E21B 43/10* (2013.01); *E21B 47/0905* (2013.01); *E21B 47/14* (2013.01); *G01V 11/002* (2013.01)

(58) Field of Classification Search
CPC .... E21B 43/10; E21B 47/0905; E21B 47/122; G01V 11/002
See application file for complete search history.

(56) References Cited

U.S. PATENT DOCUMENTS

| 8,296,113 B2 | 10/2012 | San Martin |
| 2005/0126826 A1 | 6/2005 | Moriarty et al. |

(Continued)

FOREIGN PATENT DOCUMENTS

| EP | 1898044 A2 | 3/2008 |
| GB | 2475910 A | 6/2011 |

(Continued)

OTHER PUBLICATIONS

International Search Report and Written Opinion for PCT/GB2013/052988 dated Oct. 20, 2014.

*Primary Examiner* — Omeed Alizada
(74) *Attorney, Agent, or Firm* — McDermott Will & Emery LLP (57) ABSTRACT

A method for obtaining real-time data relating to a well construction activity includes locating wellbore-lining tubing comprising at least one non-magnetic tubing section in a wellbore of a well. At least one downhole parameter is measured at a location external of the wellbore-lining tubing using at least one sensor associated with the non-magnetic tubing section. A magnetic field generating device is positioned within the non-magnetic tubing section and the device is activated to inductively couple the device to the at least one sensor. Data relating to the at least measured parameter is then transmitted through the non-magnetic tubing section to the magnetic field generating device by (Continued)

means of the inductive coupling. The data retrieved from the at least one sensor may then be transmitted to surface using a fluid pressure pulse generating device associated with the magnetic field generating device.

23 Claims, 4 Drawing Sheets (51) Int. Cl.
| | | |
|---|---|---|
| *E21B 43/10* | (2006.01) | |
| *E21B 47/09* | (2012.01) | |
| *E21B 47/14* | (2006.01) | |
| *G01V 11/00* | (2006.01) | |

(56) References Cited

U.S. PATENT DOCUMENTS

| | | | |
|---|---|---|---|
| 2005/0194132 A1* | 9/2005 | Dudley | ............ E21B 47/00 166/254.1 |
| 2009/0066535 A1 | 3/2009 | Patel et al. | |
| 2012/0017673 A1* | 1/2012 | Godager | ............ E21B 41/0085 73/152.51 |
| 2012/0106297 A1* | 5/2012 | Fraser | ............ E21B 41/0085 367/83 |

FOREIGN PATENT DOCUMENTS

| | | |
|---|---|---|
| WO | 2009070751 A1 | 6/2009 |
| WO | 2010079327 A1 | 7/2010 |
| WO | 2011004180 A2 | 1/2011 |

\* cited by examiner

DOWNHOLE METHOD AND ASSEMBLY FOR OBTAINING REAL-TIME DATA

This application claims priority to and is a national stage application of PCT Application No. PCT/GB2013/052988, filed on Nov. 13, 2013, and published as WO 2014/080178.

BACKGROUND

In the oil and gas exploration and production industry, wellbore fluids comprising oil and/or gas are recovered to surface through a wellbore which is drilled from surface. The wellbore is lined with metal wellbore-lining tubing, which is known in the industry as 'casing'. The casing serves numerous purposes, including: supporting the drilled rock formations; preventing undesired ingress/egress of fluid; and providing a pathway through which further tubing and downhole tools can pass.

The casing comprises sections of tubing which are coupled together end-to-end. Typically, the wellbore is drilled to a first depth and a casing of a first diameter installed in the drilled wellbore. The casing extends along the length of the drilled wellbore to surface, where it terminates in a wellhead assembly. The casing is sealed in place by pumping 'cement' down the casing, which flows out of the bottom of the casing and along the annular region defined between the external surface of the casing and the internal surface of the drilled wellbore.

Following appropriate testing, the wellbore is normally extended to a second depth, by drilling a smaller diameter extension of the wellbore through a cement plug at the bottom of the first, larger diameter wellbore section. A smaller diameter second casing is then installed in the extended portion of the wellbore, extending up through the first casing to the wellhead. The second casing is then also cemented in place. This process is repeated as necessary, until the wellbore has been extended to a desired depth, from which access to a rock formation containing hydrocarbons (oil and/or gas) can be achieved. Frequently a wellbore-lining tubing is located in the wellbore which does not extend to the wellhead, but is tied into and suspended (or 'hung') from the preceding casing section. This tubing is typically referred to in the industry as a 'liner'. The liner is similarly cemented in place within the drilled wellbore.

Where a liner is employed, a sealing device known as a packer is provided at the top of the liner, at the interface with the casing. A packer of this type is usually referred to in the industry as a 'liner-top packer'. The packer seals the annular region defined between an external wall of the liner, an internal wall of the larger diameter casing that the liner is located in, and the upper surface of cement that has been supplied into the wellbore to seal the liner. The packer may be carried by the liner or deployed independently, and includes a sealing element which can be deformed radially outwardly into sealing abutment with the wall of the casing. Deformation of the sealing element is typically achieved mechanically, for example by axially compressing the sealing element, by setting a certain amount of 'weight' on the packer.

Obtaining verification that the packer has been correctly mechanically set, and so provides an adequate seal, is difficult. In the past, the only way of assessing whether a packer had been correctly set was to monitor the weight applied to the packer at surface, that is the axial load imparted upon the packer to urge the sealing element radially outwardly. However, the weight observed at surface often does not correspond to that experienced by the packer, which may be positioned many hundreds of meters downhole. This is a particular problem in deviated wellbores, where it is difficult to apply the necessary weight to set the packer. The only indication that a packer had not been set correctly was if an unexpected leak/pressure drop was detected at surface, such as when pressure testing the liner to check for pressure integrity. Similar difficulties have also been encountered in other steps in wellbore construction activities, where data relating to the activity in question is difficult to obtain.

International Patent Publication No. WO-2010/079327 discloses an apparatus and method to provide monitoring of pressure outside the wellbore casing of a well in which a wireless sensor unit is placed externally of a section of non-magnetic casing, and an internal sensor energizer unit is provided inside the wellbore casing. The sensor unit includes sensors for measuring the pressure and/or temperature of the surroundings, and the sensor unit and energizer unit communicate using electromagnetic modulation techniques. The apparatus disclosed in WO-2010/079327 suffers from the disadvantage that it requires an electric cable extending to surface, both for powering the energizer unit, and for transmitting the measured pressure and/or temperature to surface. This presents significant challenges, in particular: the requirement to store long lengths of cable at surface, where space can be at a premium (especially in offshore environments); the requirement to run the cable through a wellhead at surface and along the length of the wellbore; the requirement to securely couple the cable to tubing deployed into the well; and that there is a significant risk of damage to the cable through contact with downhole components or tubing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present invention relates to a method for obtaining real-time data relating to a well construction activity, and to a corresponding downhole assembly. The present invention also relates to a downhole tool assembly for such a use. In particular, but not exclusively, the present invention relates to a method for obtaining real-time data from a location external of a wellbore-lining tubing in a wellbore of a well, and of transmitting the data to surface.

The present invention seeks to obviate or mitigate at least one of the foregoing disadvantages.

According to a first aspect of the present invention, there is provided a method of obtaining real-time data relating to a well construction activity, the method comprising the steps of: locating wellbore-lining tubing comprising at least one non-magnetic tubing section in a wellbore of a well; measuring at least one downhole parameter at a location external of the wellbore-lining tubing using at least one sensor associated with the non-magnetic tubing section; positioning a magnetic field generating device within the non-magnetic tubing section and activating the device to inductively couple the device to the at least one sensor; transmitting data relating to the at least measured parameter through the non-magnetic tubing section to the magnetic field generating device by means of the inductive coupling; and transmitting the data retrieved from the at least one sensor to surface using a fluid pressure pulse generating device associated with the magnetic field generating device.

The method of the present invention provides significant advantages over prior methods, in that it avoids the requirement to provide a cable extending to surface for power/data transmission purposes. In the method of the invention, the data obtained from the at least one sensor is transmitted to surface using the fluid pressure pulse generating device.

The wellbore construction activity may be or may comprise the positioning of wellbore-lining tubing in the wellbore. The wellbore-lining tubing may be anchored within the wellbore using conventional means, including a hanger and a sealing device such as a packer. The wellbore construction activity may be or may comprise the setting of a sealing device, such as a packer. The sealing device may be coupled to or provided as part of the wellbore-lining tubing. The sealing device may be located in an annular region defined between an external surface of the wellbore-lining tubing and an internal surface of a wall of the wellbore, or between an external surface of said tubing and an internal surface of another wellbore-lining tubing in which said tubing is located. The non-magnetic tubing section may form part of the sealing device, and in particular may be an inner tubular member of the sealing element, which serves for coupling the sealing element to adjacent sections of the wellbore-lining tubing. In 'sour' wells, where Hydrogen Sulphide (H2S) is present, metal alloys resistant to the corrosive effects of H2S are typically employed for components/tubing deployed into the wellbore, including components of the packer (such as the inner tubular member). These metal alloys are typically non-magnetic. The adjacent sections of the wellbore-lining tubing may however be of a magnetic material (such as steel), other than in sour wells.

The at least one sensor may be for measuring pressure, and where the construction activity involves setting a sealing device in the annular region, may be for measuring pressure at a location in the annular region which is beneath or downhole of the sealing device. A reduction in the real-time pressure measured by the sensor may be indicative of a leak path existing past the sealing device, and thus of incorrect setting of the sealing device. The at least one sensor may be for measuring temperature. The method may comprise measuring at least two different parameters employing different sensors, and may involve measuring pressure, temperature and/or at least one other parameter.

The method may comprise mounting the magnetic field generating device and fluid pressure pulse generating device on or in a tubing string, which may be a running/work string; releasably coupling the tubing string to the wellbore-lining tubing; running the wellbore-lining tubing and the devices into the wellbore using the tubing string; positioning the wellbore-lining tubing in the wellbore; releasing the tubing string from the wellbore-lining tubing; and then positioning the magnetic field generating device within the non-magnetic tubing section. The wellbore-lining tubing may be anchored in the wellbore prior to releasing the tubing string. Coiled tubing may be employed as the running/work string.

Reference to the magnetic field generating device being positioned within the non-magnetic tubing section should be taken to mean that the device is located within a length of the non-magnetic tubing section, optionally so that no part of the device (or at least a coil of the device) resides outside the length of the tubing section; and/or so that the magnetic field generating device is located in a position where inductive coupling with the at least one sensor is possible.

The non-magnetic tubing section may be coupled to adjacent tubing sections of the wellbore-lining tubing, which may be of a magnetic material, using suitable couplings or connectors. The non-magnetic tubing section may be coupled using connectors selected from male, pin-type and female, box-type connectors. The non-magnetic tubing section may be a collar comprising female, box-type connectors at axial ends thereof, which mate with male, pin-type connectors on adjacent tubing sections. The non-magnetic tubing section may be provided within or as part of a magnetic tubing section carrying such connectors, and may for example be welded into the magnetic tubing section.

The method may comprise retrieving the magnetic field generating device from its position within the non-magnetic tubing section following retrieval of the data to surface. This may enable a further well construction activity to be performed. The magnetic field generating device may be retrieved to surface, or moved to a position outside the non-magnetic tubing section but within the wellbore (above/uphole or below/downhole of the non-magnetic tubing section).

The tubing string may comprise a coupling for releasably coupling the string to the wellbore-lining tubing, and the coupling may be provided at a lower or downhole end of the tubing string. The magnetic field generating device may be located above or uphole of the coupling. The magnetic field generating device may be positioned outside of the non-magnetic tubing section during run-into the wellbore, and following release of the tubing string from the wellbore-lining tubing, the magnetic field generating device may be translated relative to the wellbore-lining tubing from the position outside the non-magnetic tubing section to the position within the non-magnetic tubing section. Following positioning in the non-magnetic tubing section, the magnetic field generating device may be activated to inductively couple the device to the at least one sensor and retrieve the data. The tubing string can then be retrieved to surface and wellbore construction activity can continue.

Reference to the magnetic field generating device being positioned outside the non-magnetic tubing section should be taken to mean that the device is located in the wellbore (optionally in the wellbore-lining tubing) so that no part of the device (or at least a coil of the device) resides within the non-magnetic tubing section, and/or so that the magnetic field generating device is located in a position where inductive coupling with the at least one sensor is not possible.

The method may comprise positioning the wellbore-lining tubing in the wellbore, and using the wellbore-lining tubing (or a component coupled to or provided on or in the wellbore-lining tubing) to provide a datum for subsequent movement of the magnetic field generating device to the position within the non-magnetic tubing section. This is because the axial distance between the magnetic field generating device and the non-magnetic tubing section is known prior to running of the wellbore-lining tubing into the well. Once the wellbore-lining tubing has been positioned and anchored within the wellbore, the wellbore-lining tubing can provide a datum for movement of the magnetic field generating device. This is because the non-magnetic tubing section is then effectively held against further axial movement, and so it is necessary only to move the magnetic field generating device the known axial distance to position it within the non-magnetic tubing section. This is achieved by running the wellbore-lining tubing together with the magnetic field generating device, and avoids the significant difficulty associated with estimating depth from surface which would be encountered where the wellbore-lining tubing and magnetic field generating device were run separately.

The method may comprise providing a marker, such as at least one profile (upset or recess/channel) or tag in the wellbore-lining tubing, which provides an indication at surface of the position of the magnetic field generating device within the wellbore-lining tubing. This may be of particular utility in a deviated wellbore, where the length of tubing string (carrying the magnetic field generating device) deployed into the wellbore at surface may not correspond to the axial distance that the magnetic field generating device moves downhole. A plurality of markers may be provided spaced out along a length of the wellbore-lining tubing, to provide sequential position indications as the device is moved.

The step of positioning the magnetic field generating device within the non-magnetic tubing section may comprise activating the magnetic field generating device; translating the device relative to the wellbore-lining tubing; monitoring the data transmitted to surface via the fluid pressure pulse generating device; and, on identifying receipt of data relating to the measured parameter, halting movement of the magnetic field generating device. Receipt of said data may be indicative of the magnetic field generating device being positioned within the non-magnetic tubing section, or at least of the device being located in a position where inductive coupling with the at least one sensor is possible. This may be of a particular utility where it is desired to position the magnetic field generating device in the non-magnetic tubing section in a separate or subsequent run. For example, following retrieval of data and removal of the magnetic field generating device from the wellbore, it may be desirable to re-enter the wellbore for retrieving fresh data from the at least one sensor. In another variation, it may not be possible to run the magnetic field generating device into the wellbore together with the wellbore-lining tubing, for example where downhole radial tolerances/clearances do not permit it. An electric wireline (or possibly slickline with onboard memory) could be employed to run the magnetic field generating device into the wellbore, in place of a tubing string, for example in a non-deviated wellbore. Coiled tubing could be employed for running the magnetic field generating device.

The method may comprise locating a first wellbore-lining tubing in the wellbore, said tubing having a first non-magnetic tubing section and at least one sensor associated with said section; and locating a second wellbore-lining tubing (having an outer diameter which is less than an inner diameter of the first wellbore-lining tubing) within the first tubing, the second tubing having a second non-magnetic tubing section and at least one sensor associated with said section. Such may be found when concentric casing strings are located in a wellbore, and/or where a liner string is located within and tied back to a casing string in a wellbore.

The method may comprise axially aligning the second non-magnetic tubing section relative to/within the first non-magnetic tubing section (within an acceptable operational tolerance for the magnetic field generating device). An acceptable tolerance may be up to around 1 ft (~30 cm). The method may comprise measuring at least one downhole parameter at a location external of the first wellbore-lining tubing; measuring at least one parameter at a location external of the second wellbore-lining tubing and internal of the first tubing; and transmitting the data relating to said parameters to the magnetic field generating device, which is positioned within the second non-magnetic tubing section. In this way, data may be retrieved across plural wellbore-lining tubings employing a single magnetic field generating device. The method may comprise locating at least one further such wellbore-lining tubing in the wellbore, within the second wellbore-lining tubing, and positioning the magnetic field generating device in the non-magnetic tubing section of the smallest diameter tubing.

The wellbore-lining tubing may comprise a plurality of non-magnetic tubing sections, each section associated with a respective at least one sensor. This may enable data relating to downhole parameters to be obtained at locations which are spaced apart along a length of the wellbore.

The method may comprise providing a downhole power source for powering the magnetic field generating device and/or the fluid pressure pulse generating device. The downhole power source may have a power storage capacity, and may be a battery or the like. The downhole power source may comprise a fluid driven motor or turbine, which may be coupled to a generator for generating power downhole, the motor or turbine driven by fluid pumped down into the wellbore-lining tubing.

The at least one sensor may be coupled to the non-magnetic tubing section, or mounted on or in a wall of the non-magnetic tubing section. In this way, said sensor can readily be interrogated by the magnetic field generating device when it is positioned in the non-magnetic tubing section.

Inductive coupling may be achieved by providing a coil in the magnetic field generating device, and a coil associated with the at least one sensor and which may be coupled to or mounted on or in a wall of the non-magnetic tubing section. In this way, a magnetic field generated by the magnetic field generating device provides an inductive coupling through the coil in the device and that associated with the sensor. Data transmission may be achieved by modulation of the magnetic field. The magnetic field generating device may be adapted to generate an alternating magnetic field by passing an alternating current through the coil of the device, to thereby stimulate an alternating electrical current in the coil associated with the at least one sensor.

The axial distance referred to above may be between a midpoint along a length of the magnetic field generating device and a midpoint of the non-magnetic tubing section; between axial ends of the device and the tubing section; or between the coils of the device and the tubing.

The method may comprise providing a downhole power source for providing power to operate the at least one sensor (and optionally any associated equipment). The downhole power source may have a power storage capacity, and may be a battery or the like. Additionally or alternatively, the at least one sensor (and optionally any associated equipment) may be powered through the inductive coupling, which induces an electrical current in the coil associated with the sensor/equipment.

Data relating to the at least one parameter may be stored in a memory associated with the at least one sensor. In this way, historical data relating to the parameter may be retrieved when the magnetic field generating device is positioned within the non-magnetic tubing section.

According to a second aspect of the present invention, there is provided a downhole assembly for obtaining real-time data relating to a well construction activity, the assembly comprising: at least one non-magnetic tubing section which can be provided as part of a wellbore-lining tubing that can be positioned in a wellbore of a well; at least one sensor associated with the non-magnetic tubing section, for measuring at least one downhole parameter at a location external of the wellbore-lining tubing; a magnetic field generating device which can be positioned within the non-magnetic tubing section and which is activatable to inductively couple the device to the at least one sensor, so that data relating to the at least measured parameter can be transmitted through the non-magnetic tubing section to the magnetic field generating device by means of the inductive coupling; and a fluid pressure pulse generating device which can be coupled to the magnetic field generating device, for transmitting the data retrieved from the at least one sensor to surface.

The non-magnetic tubing section may form part of a sealing device, such as a packer, which can be coupled to or provided as part of the wellbore-lining tubing. The non-magnetic tubing section may be an inner tubular member of the sealing element, which serves for coupling the sealing element to adjacent sections of the wellbore-lining tubing.

The at least one sensor may be for measuring pressure, and may be for measuring pressure at a location in an annular region which is beneath or downhole of the sealing device. The at least one sensor may be for measuring temperature. The assembly may comprise at least two different sensors, each for measuring a respective different parameter, which may be pressure, temperature and/or at least one other parameter.

The magnetic field generating device and fluid pressure pulse generating device may be mounted on or in a tubing string, which may be a running/work string. The tubing string may be releasably couplable to the wellbore-lining tubing, and may be used to run the wellbore-lining tubing and the devices into the wellbore. The tubing string may be releasable from the wellbore-lining tubing so that the magnetic field generating device can be positioned within the non-magnetic tubing section. A wireline or slickline could be employed in place of the tubing string.

The tubing string may comprise a coupling for releasably coupling the string to the wellbore-lining tubing, and the coupling may be provided at a lower or downhole end of the tubing string. The magnetic field generating device may be located above or uphole of the coupling. The magnetic field generating device may adapted to be positioned outside of the non-magnetic tubing section during run-into the wellbore, and following release of the wellbore-lining tubing, to be translated relative to the wellbore-lining tubing from the position outside the non-magnetic tubing section to the position within the non-magnetic tubing section. Following positioning in the non-magnetic tubing section, the magnetic field generating device may be adapted to be activated to inductively couple the device to the at least one sensor and retrieve the data.

The non-magnetic tubing section may be provided with couplings or connectors for coupling it to adjacent tubing sections of the wellbore-lining tubing, which may be of a magnetic material. The non-magnetic tubing section may comprise connectors selected from male, pin-type and female, box-type connectors. The non-magnetic tubing section may be a collar comprising female, box-type connectors at axial ends thereof, which mate with male, pin-type connectors on adjacent tubing sections. The non-magnetic tubing section may be provided within or as part of a magnetic tubing section carrying such connectors, and may for example be welded into the magnetic tubing section.

The assembly may comprise a first non-magnetic tubing section which can be provided as part of a first wellbore-lining tubing and at least one sensor associated with said section; and a second non-magnetic tubing section which can be provided as part of a second wellbore-lining tubing and at least one sensor associated with said section (the second tubing having an outer diameter which is less than an inner diameter of the first tubing). Data relating to parameters measured by the respective sensors may be retrieved to surface using the magnetic field generating device, which may be positionable within the second non-magnetic tubing section.

The assembly may comprise a plurality of non-magnetic tubing sections, each section associated with a respective at least one sensor. The non-magnetic tubing sections may be provided at known axial spacings along the wellbore-lining tubing, to provide an indication of the position of the magnetic field generating device within the wellbore-lining tubing. Each non-magnetic tubing section may have a unique characteristic which enables identification of the section in question at surface. For example, each may have a unique length. At least one tubing section may comprise at least two non-magnetic portions straddling a magnetic portion. The presence of the magnetic portion, its length and/or the number of magnetic portions may facilitate identification of the tubing section in question. Such may be of use, for example, where it is desired to obtain verification of positioning of the magnetic field generating device at a particular depth location in the wellbore.

The assembly may comprise a downhole power source for powering the magnetic field generating device and/or the fluid pressure pulse generating device. The downhole power source may have a power storage capacity, and may be a battery or the like. The downhole power source may comprise a fluid driven motor or turbine, which may be coupled to a generator for generating power downhole, the motor or turbine driven by fluid pumped down into the wellbore-lining tubing.

The at least one sensor may be coupled to the non-magnetic tubing section, or mounted on or in a wall of the non-magnetic tubing section.

Inductive coupling may be achieved by a coil in the magnetic field generating device, and a coil associated with the at least one sensor and which may be coupled to or mounted on or in a wall of the non-magnetic tubing section. Data transmission may be achieved by modulation of the magnetic field. The magnetic field generating device may be adapted to generate an alternating magnetic field by passing an alternating current through the coil of the device, to thereby stimulate an alternating electrical current in the coil associated with the at least one sensor.

The assembly may comprise a downhole power source for providing power to operate the at least one sensor (and optionally any associated equipment). The downhole power source may have a power storage capacity, and may be a battery or the like. Additionally or alternatively, the at least one sensor (and optionally any associated equipment) may be powered through the inductive coupling, which induces an electrical current in the coil associated with the sensor/equipment.

The assembly may comprise a memory associated with the at least one sensor for storing data relating to the at least one parameter.

The fluid pressure pulse generating device may be of the type disclosed in the applicant's International Patent Publication No. WO-2011/004180.

The non-magnetic tubing section may be of a metal or metal alloy, and may be an austenitic chromium superalloy such as that which is commercially available under the INCONEL Trade Mark.

Further features of the assembly of the second aspect of the invention may be derived from or with reference to the method set out in the first aspect of the invention.

According to a third aspect of the present invention, there is provided a downhole tool assembly for obtaining real-time data relating to a well construction activity, the assembly comprising: a magnetic field generating device which can be positioned within a non-magnetic tubing section of wellbore-lining tubing located in a wellbore; and a fluid pressure pulse generating device coupled to the magnetic field generating device; in which the magnetic field generating device is selectively activatable, to inductively couple the device to at least one sensor associated with the non-magnetic tubing section, which sensor serves for measuring at least one downhole parameter at a location external of the wellbore-lining tubing, data relating to the at least one measured parameter being retrieved through the non-magnetic tubing section by means of the inductive coupling; and in which the fluid pressure pulse generating device serves for transmitting the data retrieved from the at least one sensor to surface.

Further features of the components of the downhole tool assembly of the third aspect of the invention in common with components of the downhole assembly of the second aspect of the invention may be derived from or with reference to the second aspect.

Figure 1:
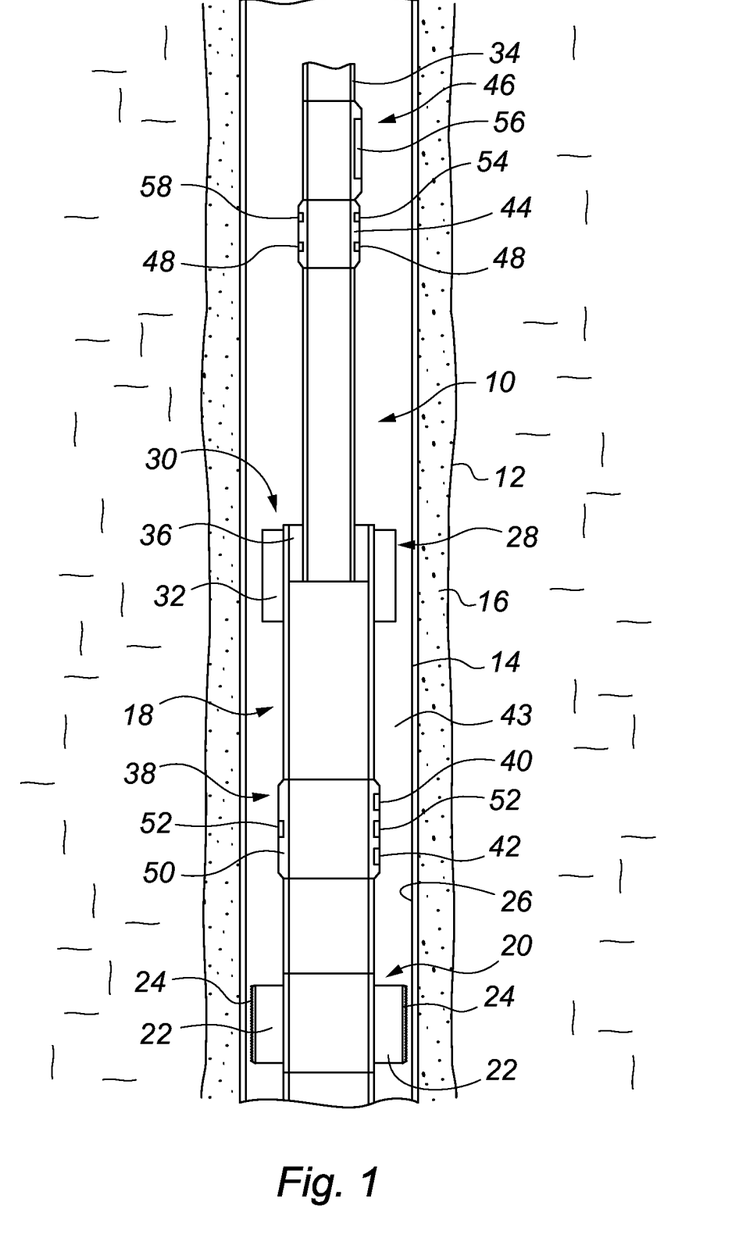
FIG. 1 is a schematic longitudinal sectional view of a downhole assembly for obtaining real-time data relating to a well construction activity in accordance with an embodiment of the present invention, illustrating a step in a method employing the assembly.

Turning firstly to FIG. 1, there is shown a schematic longitudinal sectional view of a downhole assembly for obtaining real-time data relating to a well construction activity in accordance with an embodiment of the present invention, the assembly indicated generally by reference numeral 10. The assembly 10 is shown located in a wellbore 12 which has been drilled from surface and lined with wellbore-lining tubing in the form of a casing 14. The casing 14 has been cemented in place, as indicated by the numeral 16, in a conventional fashion that is well known in the industry.

Figure 2:
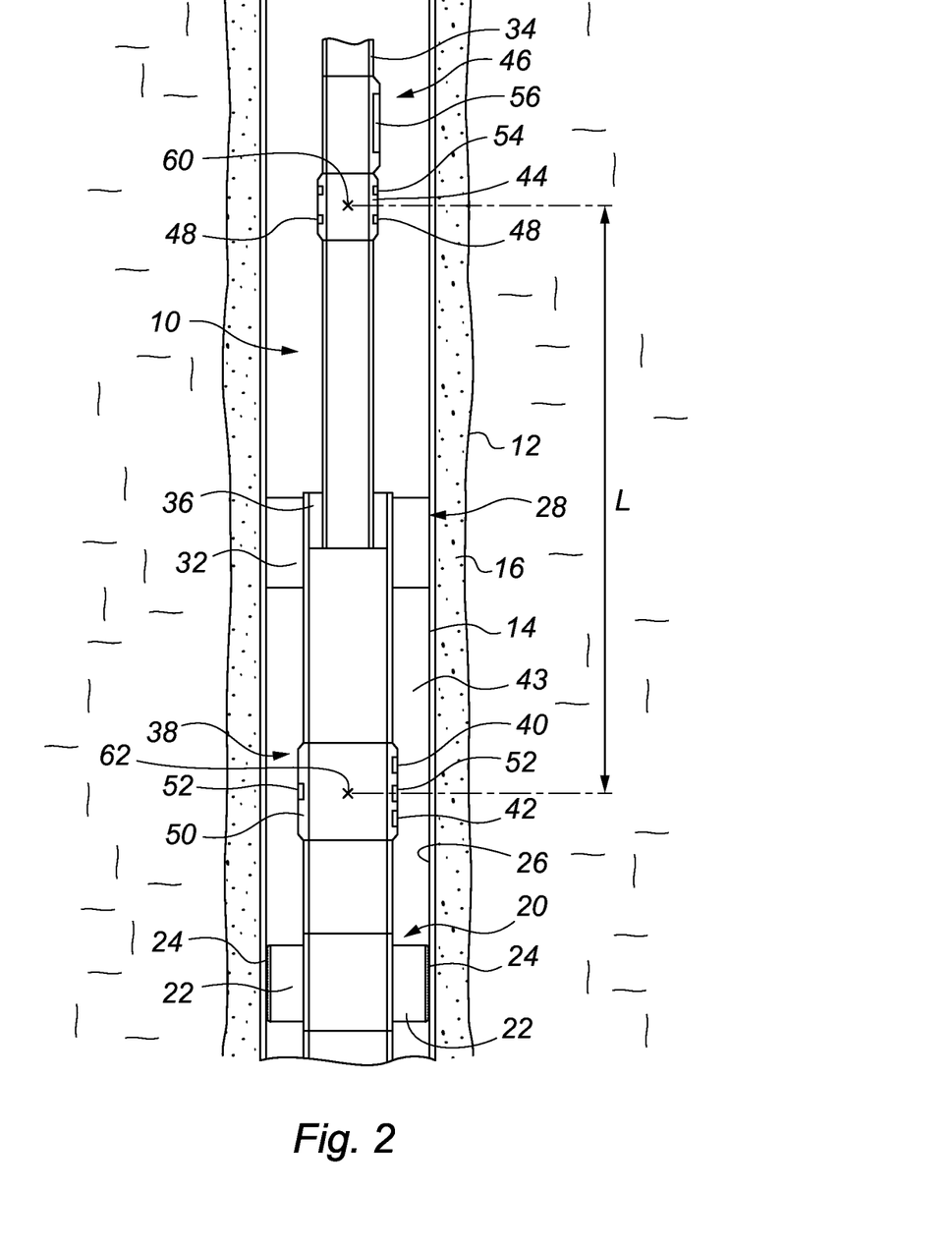
FIGS. 2 and 3 are views of the assembly of FIG. 1, illustrating further steps in the method.

The well construction activity which is illustrated in FIG. 1 is the location of a further wellbore-lining tubing, in the form of a liner 18, within the casing 14. The liner 18 extends into an open-hole (unlined) portion of the wellbore 12, which is not shown in the drawings. The liner 18 includes a device known as a liner hanger 20, which includes a plurality of slips or dogs 22 having serrated faces 24. When the liner hanger 20 is activated, the slips 22 are urged radially outwardly, whereupon the serrated faces 24 engage an inner surface 26 of the casing 14, in a fashion known in the art. This serves to suspend and thus "hang" the liner 18 from the casing 14. In addition, a sealing device in the form of a packer 28 is provided at an upper or uphole end 30 of the liner 18, and includes a deformable sealing element 32 which can be urged radially outwardly into sealing contact with the inner surface 26 of the casing 14, again in a fashion known in the art. This is achieved by applying an axially directed compressive force to the sealing element 32. The liner 18 is run-in to the wellbore 12 on a string of tubing 34 known as a work string or liner running string, which is releasably connected to the liner 18 by means of a coupling 36 of a type known in the art. The liner 18 is thus suspended from the work string 34 during run-in to the wellbore 12. The liner hanger 20 and packer 28 are then activated, to hang the liner 18 from the casing 14, and to seal the liner to the casing, as shown in FIG. 2. The downhole assembly 10 and method of the present invention has a utility in this well construction activity, as will now be described.

As is generally known in the industry, the casing 14 and liner 18 are typically of a ferrous and thus magnetic material, such as a steel. This is true in most situations, save in "sour" wells containing H2S. The assembly 10 generally comprises at least one non-magnetic tubing section 38, which is provided as part of the liner 18 positioned in the wellbore 12. Typically, the section 38 will be of a metal or metal alloy material, and may be of an austenitic Chromium superalloy, such as that which is commercially available under the INCONEL trade mark. It will be appreciated however that a wide range of other materials may be suitable. The assembly 10 also comprises at least one sensor associated with the non-magnetic tubing section 38, and in the illustrated embodiment comprises a pressure sensor 40 and a temperature sensor 42. The sensors 40 and 42 serve for measuring downhole parameters (pressure and temperature) at a location external of the liner 18, and in the illustrated embodiment, serve for measuring pressure and temperature in an annular region 43 defined between the liner 18 and the inner surface 26 of the casing 14. A magnetic field generating device 44 is provided in the work string 34, and can be positioned within the non-magnetic tubing section 38. FIG. 1 shows the field generating device 44 at a position outside the non-magnetic tubing section 38. The device 44 is activatable to inductively couple the device 44 to the pressure and temperature sensors 40 and 42. This enables real-time data relating to the measured parameters (pressure and temperature) to be transmitted through the non-magnetic tubing section 38 to the magnetic field generating device 44, by means of the inductive coupling. In this way, real-time feedback on the well construction activity can be obtained. The assembly 10 also comprises a fluid pressure pulse generating device 46 coupled to the magnetic field generating device 44, for transmitting the data retrieved from the sensors 40 and 42 to surface. This avoids a requirement to provide a cable extending to surface for data transmission purposes.

The downhole assembly 10 and method of the present invention will now be described in more detail, with reference also to FIG. 3, which is a view similar to FIGS. 1 and 2, but showing the magnetic field generating device 44 positioned within the non-magnetic tubing section 38.

As discussed above, the hanger 20 is used to hang the liner 18 from the casing 14, whilst the packer 28 is used to seal the liner 18 relative to the inner surface 26 of the casing 14. The liner 18 is typically cemented in the wellbore 12, in a similar fashion to the casing 14, cement passing up the annular region 43 to a location downhole of the hanger 20. The packer 28 acts to seal the portion of the annular region 43 between the sealing element 32 and the upper or uphole surface of the cement (not shown). The packer 28 thus prevents migration of fluid along the annular region 43 past the sealing element 32.

The assembly 10 is employed to provide real-time data relating to the positioning of the liner 18, and in particular to provide data concerning the pressure of fluid in the annular region 43 downhole of the packer 28. A reduction in the measured pressure of the fluid in the annular region 43 over time may be indicative of a leak path existing past the sealing element 32 of the packer 28, potentially due to incorrect setting of the packer 28. Such may occur where insufficient weight has been applied to the packer 28, to urge the sealing element 32 radially outwardly into abutment with the inner surface 26 of the casing 14. This can be a particular problem in deviated wellbores.

Figure 3:
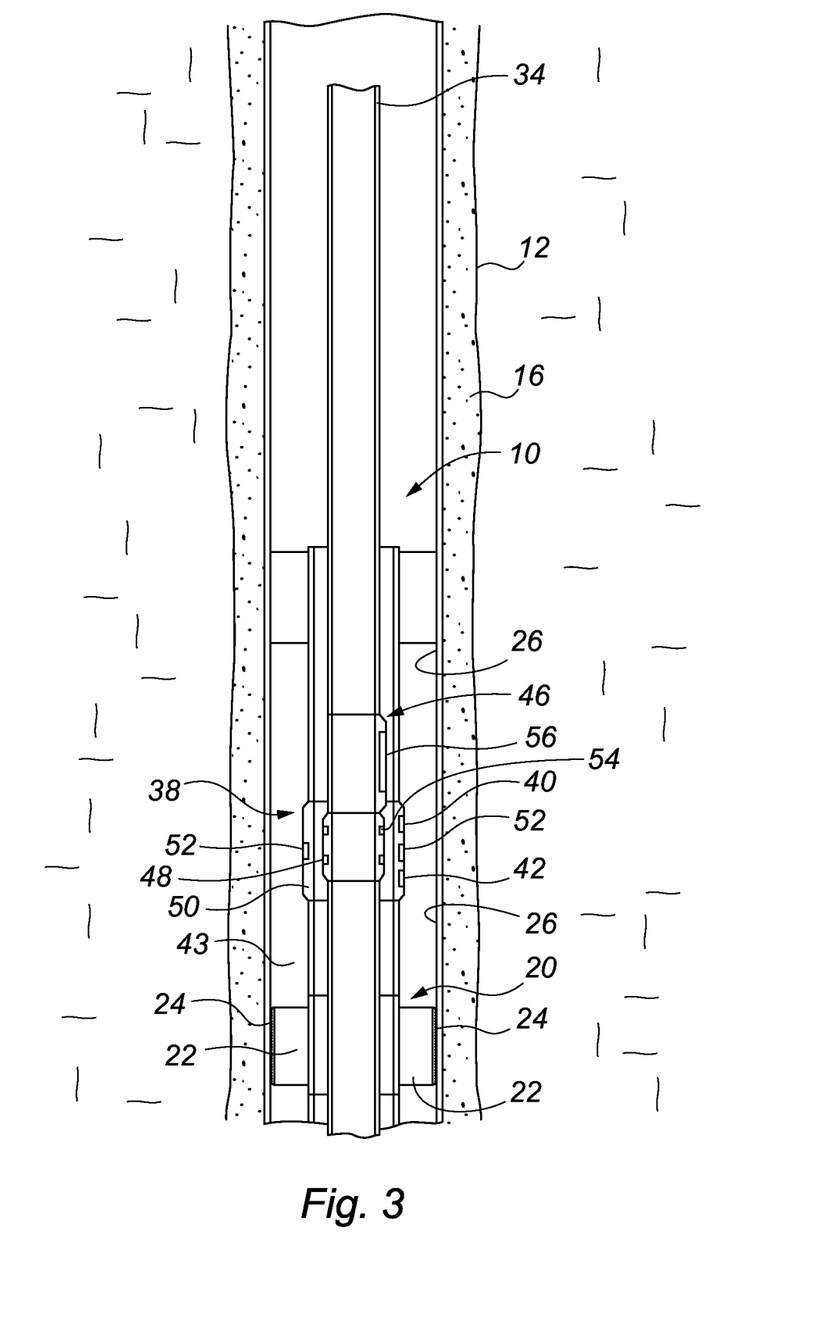

As can be seen from FIGS. 1 to 3, the method employing the downhole assembly 10 involves running the liner 18 in on the work string 34 (FIG. 1), positioning the liner 18 in the casing 14 (FIG. 2), releasing the work string 34 from the liner 18 by deactivating or releasing the coupling 36, and then translating the work string 34 to move the magnetic field generating device 44 axially downwardly to a position where it resides within the non-magnetic tubing section 38 (FIG. 3).

Following the teachings of WO-2010/079327, the disclosure of which is incorporated herein by way of reference, the magnetic field generating device 44 comprises a coil 48 through which an alternating current (AC) is passed, resulting in an alternating magnetic field which penetrates a wall 50 of the non-magnetic tubing section 38. The transmission equation of an oscillating electromagnetic signal is dependent on the "skin depth" or "skin effect" of the material, which has frequency dependency. The skin effect (δ) can be derived from the simplified equation:

$$\delta = \frac{1}{\sqrt{\pi f \mu \sigma}}$$

where μ and σ are the permeability and conductivity of the material and is the frequency.

By way of example the frequency dependency for two different types of steel are tabulated below:

| Frequency | Non Magnetic 316 Skin Depth mm | Ferrous ST37 Skin Depth mm |
| --- | --- | --- |
| 40 | 68.5 | 1.4 |
| 50 | 61.3 | 1.3 |
| 70 | 51.8 | 1.1 |
| 100 | 43.3 | 0.9 |
| 200 | 30.6 | 0.6 |
| 300 | 25.0 | 0.5 |
| 500 | 19.4 | 0.4 |
| 1000 | 13.7 | 0.3 |

As can be seen, for transmission through a metal barrier, the use of non-magnetic steel is preferred, and also lower frequencies.

The non-magnetic tubing section 38 includes a corresponding coil 52. When exposed to the alternating magnetic field generated by the device 44, an alternating current is stimulated in the coil 52. This can be converted into a direct current (DC) for powering the sensors 40 and 42 and other equipment. However, an alternative power source may be provided for the sensors 40 and 42, such as a battery (not shown) mounted in the non-magnetic tubing section 38. The magnetic field can be modulated (using appropriate transceivers) to transmit the data relating to the pressure and temperature measured by the sensors 40 and 42, which are associated with the coil 52 via appropriate circuitry (not shown). For example, the magnetic field generating device 44 may be arranged so that the magnetic field which is generated is modulated to send a signal which instructs the circuitry associated with the sensors 40 and 42 to transmit the data relating to the measured parameters. On receipt of this signal, the circuitry modulates the magnetic field by varying the load drawn on the current induced in the coil 52. This is recognised by the magnetic field generating device 44 as being indicative of the measured pressure and temperature. This data is then transmitted to surface via the fluid pressure pulse generating device 46, by means of a chain of positive and/or negative fluid pressure pulses imparted upon fluid in the work string 34. Connection between the pulse generating device 46 and the field generating device 44 is achieved by means of suitable circuitry 54 in the field generating device 44, which is associated with a pulse generating module 56 in the pulse generating device 46. In this respect, the pulse generating device 46 is of a type such as that disclosed in the applicant's International patent publication number WO-2011/004180, the disclosure of which is incorporated herein by way of reference.

Following retrieval of the pressure and temperature data to surface, the magnetic field generating device 44 may be retrieved to surface, by pulling the tubing string 34 from the wellbore 12. A further well construction activity may then be carried out, for example perforation of the liner 18, installation of production tubing (not shown) and/or other typical well completion activities. It will be understood however that the magnetic field generating device 44 may be maintained within the wellbore 12, and used in a further well construction activity. For example, the liner 18 may carry a further non-magnetic tubing section (not shown), positioned further downhole. The magnetic field generating device 44 may be moved further downhole and positioned within the further non-magnetic tubing section, for retrieving data measured by at least one sensor associated with the further non-magnetic tubing section. This may provide the ability to retrieve data from locations which are spaced apart along a length of the wellbore 12. For example, it may be desirable to obtain pressure/temperature data from a location in the wellbore 12 adjacent to a rock formation containing well fluids, prior to perforation of the liner 18.

The magnetic field generating device 44 may be powered by an onboard power source such as a battery 58, although typical power requirements may be such that an alternative power source is required. One particular option would be to provide a downhole motor or turbine coupled to an electrical generator (not shown), to provide power for operation of the field generating device 44. This would be achieved by passing fluid down through the work string 34 to drive the motor or turbine.

Reference is made herein to the magnetic field generating device 44 being positioned outside the non-magnetic tubing section 38. This should be taken to mean that the device 44 is located so that no part of the device resides within the non-magnetic tubing section 38, and/or so that the magnetic field generating device 44 is located in a position where inductive coupling with the sensors 40 and 42 is not possible. Typically, the magnetic field generating device 44 will not be activated until such time as it is moved to a position where it is located within the non-magnetic tubing section 38. This provides advantages in terms of power saving. However and as now will be described, the magnetic field generating device 44 may be activated, to generate the magnetic field, prior to movement of the device for positioning within the non-magnetic tubing section 38.

In the method illustrated in FIGS. 1 to 3, the liner 18 is used to provide a datum for subsequent movement of the magnetic field generating device 44 from the position of FIG. 1, to the position where it is located within the non-magnetic tubing section 38 (FIG. 3). This is because the axial distance between the field generating device 44 and the non-magnetic tubing section 38 is known prior to running of the liner 18 into the well. Accordingly, once the liner 18 has been positioned and anchored within the wellbore 12 (FIG. 2), the liner can provide a datum for movement of the field generating device 44. This is because the non-magnetic tubing section 38 is then effectively held against further axial movement, and so it is necessary only to move the field generating device 44 the known axial distance to position it within the non-magnetic tubing section 38. This is achieved by running the liner 18 together with the field generating device 44, which is coupled to the liner by means of the work string 34. This avoids the significant difficulty associated with estimating depth from surface which would be encountered where the liner 18 and field generating device 44 were run separately. The axial distance which is referred to may be that which exists between a midpoint 60 along a length of the field generating device 44 and a midpoint 62 along a length of the non-magnetic tubing section 38, this distance indicated by the arrow L in FIG. 2.

However and as mentioned above, the field generating device 44 may be activated prior to translation of the device relative to the liner 18, and in this situation effectively serves to locate the non-magnetic tubing section 38. In this situation, the data transmitted to surface via the pulse generating device 46 is monitored and, on identifying receipt of data relating to the pressure and temperature measured by the sensors 40 and 42, movement of the field generating device 44 is halted. This is because receipt of the data is indicative of the field generating device 44 being positioned within the non-magnetic tubing section 38, or at least of the device 44 being located in a position where inductive coupling with the sensors 40 and 42 is possible. This may be of a particular utility where it is desired to position the field generating device 44 in the non-magnetic tubing section 38 in a separate or subsequent run. For example, it may not be possible to run the field generating device 44 into the wellbore 12 together with the liner 18, for example where downhole radial tolerances or clearances between the casing 14 and liner 18 do not permit it. Additionally or alternatively, it may be desired to retrieve fresh data from the sensors 40 and 42 at a later date, for example to verify continued sealing function of the packer 28. As the work string 34 carrying the field generating device 44 would have been removed following completion of the well construction activity, this requires the string to be re-run into the wellbore 12. The procedure outlined above facilitates this operation.

Figure 4:
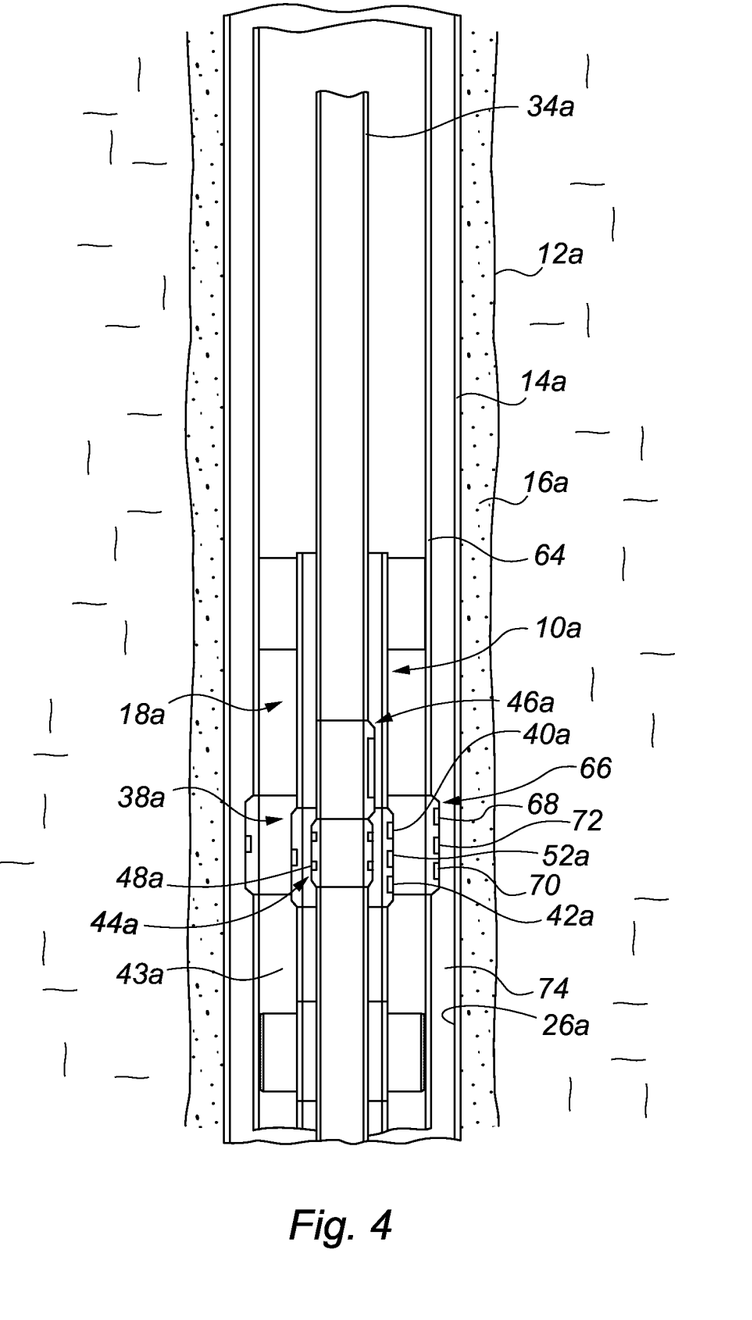
FIG. 4 is a schematic longitudinal sectional view of a downhole assembly for obtaining real-time data relating to a well construction activity in accordance with another embodiment of the present invention, illustrating a step in a method employing the assembly.

Turning now to FIG. 4, there is shown a variation on the method shown and discussed above in relation to FIGS. 1 to 3, employing a downhole assembly 10a according to another embodiment of the invention. Like components of the assembly 10a with the assembly 10 of FIGS. 1 to 3 share the same reference numerals, with the addition of the suffix 'a'. Only the main differences between the assembly 10a and the assembly 10 of FIGS. 1 to 3 will be shown and described in detail herein.

In this embodiment, a wellbore 12a is shown in which a first wellbore-lining tubing in the form of a first casing 14a has been positioned in the wellbore and cemented in place at 16a. A second, smaller diameter casing 64 has then been located in the first casing 14a, extending back up to a wellhead at surface (not shown), in the same way as the casing 14a. Finally, a liner 18a has been positioned within the second casing 64, and the well construction activity associated with positioning of the liner 18a is shown in FIG. 4.

The second casing 64 includes a non-magnetic tubing section 66, which forms a first such section of the assembly 10a. At least one sensor is provided and associated with the non-magnetic tubing section 66, and in the illustrated embodiment, pressure and temperature sensors 68 and 70 are provided. The liner 18a, which has an outer diameter that is less than an inner diameter of the casing 64, has a non-magnetic tubing section 38a with pressure and temperature sensors 40a and 42a. The non-magnetic tubing section 38a forms a second such section of the assembly 10a. The assembly 10a also comprises a single magnetic field generating device 44a, which is run on a work string 34a, the work string being employed to position the liner 18a, in the fashion described above.

The method employing the assembly 10a comprises axially aligning the second non-magnetic tubing section 38a relative to the first non-magnetic tubing section 66, within an acceptable operational tolerance for the field generating device 44. An acceptable tolerance may be an axial spacing of up to around 1 ft (~30.48 centimeters) between a coil 48a of the field generating device 44 and coils 72 and 52a of the first and second non-magnetic tubing sections 66 and 38a. However, it is anticipated that detectable results could be obtained with an axial spacing of up to around 3 ft (~91.44 centimeters).

The method involves measuring the pressure and temperature in an annular region 74 defined between the second casing 64 and an inner surface 26a of the first casing 14a, typically in an un-cemented portion of the wellbore 12a, such as may exist above an overlap region between the casings 14a and 64. This is achieved using the sensors 68 and 70. Measurement of the pressure in the annular region 74 in particular may serve to identify whether a leak path exists along the annular region 74, indicative of fluid migration past the cement and thus an inadequate cement bond existing. It will be understood that the annular region 74 is cemented at a location further downhole, so that cement resides within and so seals the annular region downhole of the non-magnetic tubing section 66. The annular region 74 will also typically be sealed uphole of the section 66, such as by a packer. The result of this is that the pressure in the annular region 74 should remain static, any variation being indicative of a potential problem.

In addition, the pressure and temperature is measured in an annular region 43a defined between the liner 18a and the second casing 64 using the sensors 40a and 42a, for reasons such as those discussed above in relation to the method of FIGS. 1 to 3. Axial alignment of the non-magnetic tubing sections 38a and 66 enables data relating to all of these measured parameters to be retrieved using a single magnetic field generating device 44a. Alignment within the acceptable tolerance discussed above facilitates penetration of the magnetic field generated by the device 44 through both the non-magnetic tubing sections 38a and 66. All of this data is then retrieved to surface via a fluid pressure pulse generating device 46a coupled to the field generating device 44a, in the fashion described above.

In a further variation on the embodiment shown and described in FIG. 4, a further wellbore-lining tubing, for example a further casing, may be located in the wellbore 12a and provided with a non-magnetic tubing section carrying associated sensors (not shown). This may enable data across three or more well annuli to be obtained.

Various modifications may be made to the foregoing without departing from the spirit or scope of the present invention.

For example, the non-magnetic tubing section may form part of the sealing device (packer), and in particular may be an inner tubular member of the sealing element, which serves for coupling the sealing element to adjacent sections of the wellbore-lining tubing. In 'sour' wells, where Hydrogen Sulphide (H2S) is present, metal alloys resistant to the corrosive effects of H2S are typically employed for components/tubing deployed into the wellbore, including components of the packer (such as the inner tubular member). These metal alloys are typically non-magnetic. The adjacent sections of the wellbore-lining tubing may however be of a magnetic material (such as steel), other than in sour wells.

The method may comprise measuring more than two different parameters employing different sensors, and may involve measuring pressure, temperature and/or at least one other parameter.

A wireline or slickline could conceivably be employed in place of the tubing string shown and described for running the wellbore-lining tubing (liner), for example in a non-deviated wellbore. Such would be employed in situations where the magnetic field generating device is run-in separately from the wellbore-lining tubing (which will always be run-in suspended from a running or workstring of tubing).

The wellbore-lining tubing may comprise a plurality of non-magnetic tubing sections, each section associated with a respective at least one sensor. This may enable data relating to downhole parameters to be obtained at locations which are spaced apart along a length of the wellbore.

The at least one sensor (and optionally any associated equipment) may be powered through the inductive coupling, which induces an electrical current in the coil associated with the sensor/equipment.

Data relating to the at least one parameter may be stored in a memory associated with the at least one sensor. In this way, historical data relating to the parameter may be retrieved when the magnetic field generating device is positioned within the non-magnetic tubing section.

The non-magnetic tubing section shown and described above will typically be coupled to adjacent tubing sections of the wellbore-lining tubing, which may be of a magnetic material, using suitable connectors. The non-magnetic tubing section may be coupled using connectors selected from male, pin-type and female, box-type couplings. The non-magnetic tubing section may be a collar comprising female, box-type connectors at axial ends thereof, which mate with male, pin-type connectors on adjacent tubing sections. The non-magnetic tubing section may be provided within or as part of a magnetic tubing section carrying such connectors, and may for example be welded into the magnetic tubing section.

The method may comprise providing a marker, such as at least one profile (upset or recess/channel) or tag in the wellbore-lining tubing, which provides an indication at surface of the position of the magnetic field generating device within the wellbore-lining tubing. This may be of particular utility in a deviated wellbore, where the length of tubing string (carrying the magnetic field generating device) deployed into the wellbore at surface may not correspond to the axial distance that the magnetic field generating device moves downhole. A plurality of markers may be provided spaced out along a length of the wellbore-lining tubing, to provide sequential position indications as the device is moved.

The assembly may comprise a plurality of non-magnetic tubing sections, each section associated with a respective at least one sensor. The non-magnetic tubing sections may be provided at known axial spacings along the wellbore-lining tubing, to provide an indication of the position of the magnetic field generating device within the wellbore-lining tubing. Each non-magnetic tubing section may have a unique characteristic which enables identification of the section in question at surface. For example, each may have a unique length. At least one tubing section may comprise at least two non-magnetic portions straddling a magnetic portion. The presence of the magnetic portion, its length and/or the number of magnetic portions may facilitate identification of the tubing section in question. Such may be of use, for example, where it is desired to obtain verification of positioning of the magnetic field generating device at a particular depth location in the wellbore.

What is claimed is:

1. A method of obtaining real-time data relating to a well construction activity, the method comprising the steps of:

running wellbore-lining tubing into a wellbore as releasably coupled to a tubing string that extends to a well surface location, wherein the wellbore-lining tubing provides a non-magnetic tubing section, and wherein a magnetic field generating device and a fluid pressure pulse generating device are mounted to the tubing string;

positioning the wellbore-lining tubing in the wellbore at a desired location;

measuring a downhole parameter at the desired location external of the wellbore-lining tubing using a sensor mounted to the non-magnetic tubing section;

releasing the tubing string from the wellbore-lining tubing and advancing the tubing string into the wellbore-lining tubing;

positioning the magnetic field generating device within the non-magnetic tubing section and activating the magnetic field generating device to inductively couple the magnetic field generating device to the sensor;

transmitting data relating to the downhole parameter through the non-magnetic tubing section to the magnetic field generating device by means of the inductive coupling; and transmitting the data retrieved from the sensor to the well surface location using the fluid pressure pulse generating device.

2. The method of claim 1, further comprising anchoring the wellbore-lining tubing in the wellbore prior to releasing the tubing string.

3. The method of claim 1, comprising retrieving the magnetic field generating device from within the non-magnetic tubing section following transmission of the data to the well surface location.

4. The method of claim 3, further comprising advancing the magnetic field generating device further into the wellbore-lining tubing and to a position outside the non-magnetic tubing section.

5. The method of claim 1, further comprising:

activating the magnetic field generating device once positioned within the non-magnetic tubing section to inductively couple the magnetic field generating device to the sensor.

6. The method of claim 1, further comprising:

activating the magnetic field generating device prior to advancing the tubing string into the wellbore-lining tubing;

monitoring the data transmitted to the well surface location via the fluid pressure pulse generating device; and halting movement of the magnetic field generating device upon identifying receipt of data relating to the downhole parameter.

7. The method of claim 1, further comprising positioning the wellbore-lining tubing in the wellbore, and using the wellbore-lining tubing to provide a datum for subsequent movement of the magnetic field generating device.

8. The method of claim 1, further comprising providing a marker in the wellbore-lining tubing, which provides an indication at the well surface location of a position of the magnetic field generating device within the wellbore-lining tubing.

9. The method of claim 8, further comprising providing a plurality of markers spaced out along a length of the wellbore-lining tubing to provide sequential position indications as the magnetic field generating device is moved.

10. The method of claim 1, wherein the wellbore-lining tubing is a first wellbore-lining tubing, the non-magnetic tubing section is a first non-magnetic tubing section, and the sensor is a first sensor, the method further comprising:

locating a second wellbore-lining tubing within the first wellbore-lining tubing, the second wellbore-lining tubing having a second non-magnetic tubing section and a second sensor mounted to the second non-magnetic tubing section.

11. The method of claim 10, further comprising axially aligning the second non-magnetic tubing section within the first non-magnetic tubing section within an acceptable operational tolerance for the magnetic field generating device.

12. The method of claim 10, wherein the downhole parameter is a first downhole parameter, the method further comprising:

measuring a second downhole parameter at a location external of the second wellbore-lining tubing and internal of the first tubing; and transmitting data relating to the second downhole parameter to the magnetic field generating device positioned within the second non-magnetic tubing section.

13. The method of claim 1, wherein the wellbore-lining tubing comprises a plurality of non-magnetic tubing sections spaced apart along the tubing, each non-magnetic tubing section being associated with a corresponding sensor, and wherein the method further comprises retrieving downhole parameter data at a location of each non-magnetic tubing section.

14. The method of claim 1, wherein inductive coupling is achieved by providing a coil in the magnetic field generating device, and a coil associated with the sensor, the coil being coupled to a wall of the non-magnetic tubing section, and wherein data transmission is achieved by modulation of the magnetic field.

15. The method of claim 1, wherein the well construction activity comprises anchoring the wellbore-lining tubing within the wellbore using a hanger and a sealing device.

16. The method of claim 15, wherein the well construction activity further comprises:

sealing with the sealing device an annular region defined between an external surface of the wellbore-lining tubing and an internal surface of a wall of the wellbore or an internal surface of another wellbore-lining tubing in which said tubing is located; and measuring a pressure in the annular region at a location downhole from the sealing device using the sensor.

17. A downhole assembly for obtaining real-time data relating to a well construction activity, the assembly comprising:

a wellbore-lining tubing extendable into a wellbore and releasably coupled to a tubing string that extends to a well surface location;

a non-magnetic tubing section provided as part of the wellbore-lining tubing;

a sensor mounted to the non-magnetic tubing section to measure a downhole parameter at a location external of the wellbore-lining tubing;

a magnetic field generating device mounted to the tubing string and activatable to inductively couple to the sensor and thereby enable transmission of data relating to the downhole parameter through the non-magnetic tubing section to the magnetic field generating device; and a fluid pressure pulse generating device mounted to the tubing string for transmitting the data retrieved from the sensor to a well surface location, wherein releasing the tubing string from the wellbore-lining tubing enables the magnetic field generating device to advance into the wellbore-lining tubing to inductively couple to the sensor.

18. The downhole assembly of claim 17, wherein the non-magnetic tubing section forms part of a sealing device which can be coupled to the wellbore-lining tubing.

19. The downhole assembly of claim 18, wherein the non-magnetic tubing section is an inner tubular member of the sealing element, which serves for coupling the sealing element to adjacent sections of the wellbore-lining tubing.

20. The downhole assembly of claim 17, wherein the wellbore-lining tubing is a first wellbore-lining tubing, the non-magnetic tubing section is a first non-magnetic tubing section, and the sensor is a first sensor, the downhole assembly further comprising:

a second non-magnetic tubing section provided as part of a second wellbore-lining tubing and a second sensor mounted to the second non-magnetic tubing section, the second wellbore-lining tubing having an outer diameter less than an inner diameter of the first wellbore-lining tubing;

wherein data relating to downhole parameters measured by the first and second sensors are retrieved using the magnetic field generating device positioned within the second non-magnetic tubing section.

21. The downhole assembly of claim 17, further comprising a plurality of non-magnetic tubing sections forming part of the wellbore-lining tubing, each non-magnetic tubing section being associated with a corresponding sensor, wherein the non-magnetic tubing sections are provided at known axial spacings along the wellbore-lining tubing to provide an indication of the position of the magnetic field generating device within the wellbore-lining tubing.

22. The downhole assembly of claim 21, wherein each non-magnetic tubing section has a unique characteristic which enables identification of the section at the well surface location.

23. The downhole assembly of claim 21, wherein at least one of the plurality of non-magnetic tubing sections comprises at least two non-magnetic portions straddling a magnetic portion to facilitate identification of the tubing section.

* * * * *